ANNA E. BALDWIN.

Improvement in Milk Coolers.

No. 4,573. Reissued Oct. 3, 1871.

Witnesses:

Harry M. Phillips

Parker H. Sweet, Jr.

Inventor:

Anna E. Baldwin by Johnson, Klancke & Co her attorneys

AM. PHOTO-LITHOGRAPHIC CO. N.Y. (OSBORNE'S PROCESS.)

UNITED STATES PATENT OFFICE.

ANNA E. BALDWIN, OF NEWARK, NEW JERSEY.

IMPROVEMENT IN MILK-COOLERS.

Specification forming part of Letters Patent No. 93,583, dated August 10, 1869; reissue No. 4,573, dated October 3, 1871.

*To all whom it may concern:*

Be it known that I, ANNA E. BALDWIN, of Newark, in the county of Essex and State of New Jersey, have invented a new and useful Improvement in Milk-Coolers, of which the following is a specification:

My invention consists in the construction of an apparatus for cooling milk in such a manner that the latter may be from time to time gently stirred in order that every particle of it becomes exposed to the cooling-surface.

Figure 1:
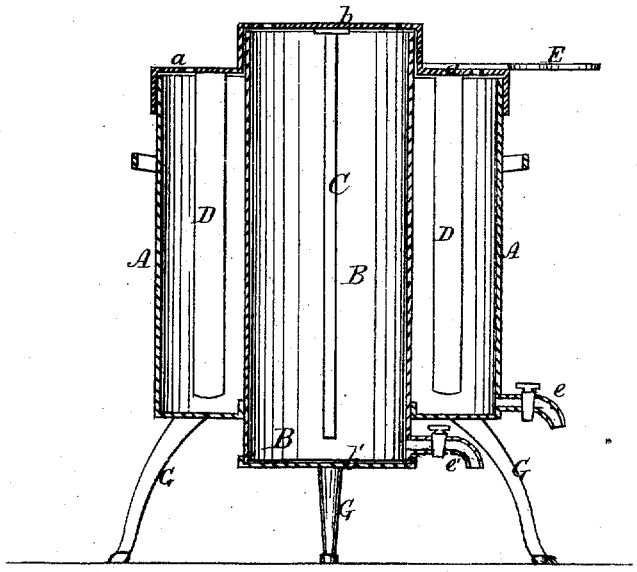
Figure 2:
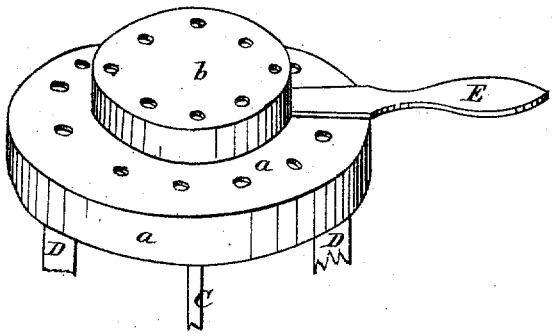

In the accompanying drawing, Figure 1 is a vertical section of my improved milk-cooler, and Fig. 2 is a detached perspective view of the cover thereof.

In the drawing, A represents a vessel of any convenient size, through which a tube, B, passes centrally, and which may extend beyond the vessel A, above and below. This tube may be closed at the bottom by a cover, *b'*, which may be screwed on or otherwise secured so as to be removable and to allow the tube to be used without it. Its top is closed by a lid, *b*, formed on and in one piece with the lid *a* of vessel A. Both of these lids may be perforated. To the under side of lid *b* is secured, centrally, a paddle or stirrer, C, and to the under side of lid *a* two or more paddles or stirrers D, which paddles C D extend downwardly to near the bottom of their respective vessels. The cover is provided with a handle, E, by means of which it may be turned in either direction with its stirrers. The vessel A and the tube B may be each provided with a faucet, *e e'*, through which the milk and water may be drawn off. The vessel A may be placed on legs G or on a bench provided with a hole to allow tube B to protrude through; or the tube B may be at its lower end made even with the bottom of vessel A, so as to dispense with the use of either legs or bench. Cold water or ice is placed in the tube B and the vessel A filled with milk. The lid *a b* being placed in position is occasionally turned in either direction, the paddles C D gently stirring the water or ice and the milk, thus bringing every particle of cold water or ice into contact with the walls of the tube and exposing every particle of the milk to its cold surface.

When cold water alone is used as a cooling medium, the cover *b'* may be removed from the tube B and the whole apparatus set into a tub or other receptacle filled with cold water, so that the water not only surrounds vessel A, but fills tube B, and thus the milk being gently stirred by the paddles D is brought into contact with the double cooling surfaces. In this case the paddle C may be dispensed with, being unnecessary.

The perforations of lids *a b* allow the heat or warmth to escape, although they are not an absolutely necessary part of the invention.

Having described my invention, I claim—

1. The combination, in a milk-cooling apparatus, of the vessel A, central tube B, and agitating-paddles D, substantially as and for the purpose described.

2. The agitators of the milk and cooling-chambers, when attached to and operated simultaneously by one and the same cover *a b*, as described.

3. The milk-cooling apparatus, consisting of vessel A, tube B, lid *a b*, when provided with paddles C D, handle E, and faucets *e e'*, substantially as and for the purpose described.

In testimony whereof I have hereunto set my hand this 31st day of August, A. D. 1871, in the presence of two witnesses.

Witnesses: ANNA E. BALDWIN.

JAMES F. BOND,

SOPHIA B. COREY.

(45)